(12) United States Patent
Sandler et al.

(10) Patent No.: US 9,197,595 B1
(45) Date of Patent: Nov. 24, 2015

(54) EVALUATING IP-LOCATION MAPPING DATA

(75) Inventors: Mark M. Sandler, Mountain View, CA (US); Krzysztof Duleba, Zurich (CH); Luuk van Dijk, Zurich (CH); Andras Erdei, Zürich (CH)

(73) Assignee: GOOGLE INC., Mountain View, CA (US)

( * ) Notice: Subject to any disclaimer, the term of this patent is extended or adjusted under 35 U.S.C. 154(b) by 172 days.

(21) Appl. No.: 13/464,797

(22) Filed: May 4, 2012

(51) Int. Cl.
G06F 15/16 (2006.01)
H04L 29/12 (2006.01)

(52) U.S. Cl.
CPC .................................. *H04L 61/2007* (2013.01)

(58) Field of Classification Search
USPC ............. 705/7.31–7.37; 706/45–62; 709/245, 709/246
See application file for complete search history.

(56) References Cited

U.S. PATENT DOCUMENTS

| 6,684,250 B2 | 1/2004 | Anderson et al. |
| 6,889,053 B1 | 5/2005 | Chang et al. |
| 6,947,978 B2 | 9/2005 | Huffman et al. |
| 7,062,572 B1* | 6/2006 | Hampton ...................... 709/245 |
| 7,171,220 B2 | 1/2007 | Belcea |
| 2002/0021675 A1 | 2/2002 | Feldmann |
| 2002/0143991 A1 | 10/2002 | Chow et al. |
| 2003/0074471 A1* | 4/2003 | Anderson ......... H04L 29/12009 709/245 |
| 2003/0110130 A1 | 6/2003 | Pelletier |
| 2008/0147857 A1* | 6/2008 | Oliver et al. ................... 709/224 |
| 2009/0144214 A1* | 6/2009 | Desaraju et al. ................ 706/46 |
| 2009/0144411 A1 | 6/2009 | Winkler et al. |
| 2009/0177730 A1* | 7/2009 | Annamalai ............. H04W 4/02 709/202 |
| 2009/0299824 A1* | 12/2009 | Barnes, Jr. ...................... 705/10 |
| 2012/0102219 A1 | 4/2012 | Speckbacher et al. |
| 2012/0117254 A1* | 5/2012 | Ehrlich et al. ................ 709/228 |
| 2012/0190380 A1* | 7/2012 | Dupray et al. ............. 455/456.1 |
| 2012/0297089 A1* | 11/2012 | Carothers ..................... 709/245 |

OTHER PUBLICATIONS

'A Learning-based Approach for IP Geolocation', http://complex.elte.hu/~haga/publications/comnet_geoloc.pdf, B. Eriksson et al., University of Wisconsin—Madison, Oct. 9, 2009, pp. 1-10.
'A Model Based Approach for Improving Router Geolocation', http://cs-people.bu.edu/eriksson/papers/erikssonPAM10.pdf, S. Laki et al., Computer Networks 54 (2010) pp. 1490-1501.

* cited by examiner

*Primary Examiner* — Mohamed Wasel
*Assistant Examiner* — Tsung Wu
(74) *Attorney, Agent, or Firm* — Marshall, Gerstein & Borun LLP

(57) ABSTRACT

Among other disclosed subject matter, a computer-implemented method includes receiving a first, a second and a third network address mapping. The method includes mapping each of the network addresses in the first, second and third network address mappings to respective first, second and third locations. The method includes determining, for each of the network addresses in the first, second and third network address mappings, location agreements. The method includes determining a first and second network address mapping agreement rate, a first and third network address mapping agreement rate, and a second and third network address mapping agreement rate, respectively based on location agreements determined for each of the network addresses. The method includes determining a confidence level associated with the first network address mapping based on the agreement rates.

41 Claims, 4 Drawing Sheets

EVALUATING IP-LOCATION MAPPING DATA

BACKGROUND

This document relates to evaluating IP-location mapping data.

As systems, computers or data processing apparatus interact with online computer networks (e.g., the Internet, an intranet, etc), they are each associated with an IP address. Each IP address is associated with an Internet service provider and identifies the computer and the Internet service provider associated with the IP address.

Systems can determine geographical information associated with or mapped to an IP address that has been assigned to or associated with a computer (referred to as "geolocation data" or "IP-location mapping data"). For example, geolocation data or IP-location mapping data can include a country, a state, a city, a street address or latitude/longitude coordinates associated with a computer assigned to an IP address and can be determined based on various signals and indicators.

SUMMARY

This document describes techniques for evaluating IP-location mapping data. IP-location mapping data is also referred to as geolocation data. Two independent sets of IP-location mapping data, called "evaluation data sets," can be received or accessed. Each evaluation data set includes IP addresses and geolocation data associated with each of the IP addresses. Each evaluation data set can be generated from different sources. For example, the first evaluation data set can be generated from users' billing/shipping information, and the second evaluation data set can be generated from advertising account data. A third set of IP-location mapping data, e.g., a determined IP-location mapping data set, can be obtained from a system that predicts IP-location mapping data, e.g., a geolocation predictor system. The determined IP-location mapping data set can include IP addresses and one or more geographical locations associated with each of the IP addresses in the data set. Subsets of data from the determined IP-location mapping data set and the two evaluation data sets can be formed. An agreement rate can be generated for each combination of the three subsets, e.g., the agreement rate between the first and second evaluation subsets, the agreement rate between the first evaluation subset and the determined data subset and the agreement rate between the second evaluation subset and the determined data subset. The agreement rates can be used to generate or determine a confidence level associated with the determined IP-location mapping data set.

In general, one aspect of the subject matter described in this specification may be embodied in methods that include the actions of receiving a first, a second and a third network address mapping. Each of the first, second and third network address mappings containing a plurality of common network addresses and one or more associated locations to which each network address is mapped. The methods include mapping each of the network addresses in the first, second and third network address mappings to respective first, second and third locations. The methods include determining, for each of the network addresses in the first, second and third network address mappings, a first and second location agreement, a first and third location agreement, and a second and third location agreement. The methods include determining a first and second network address mapping agreement rate, a first and third network address mapping agreement rate, and a second and third network address mapping agreement rate, respectively based on the first and second location agreements, the first and third location agreements, and the second and third location agreements determined for each of the network addresses. The methods include determining a confidence level associated with the first network address mapping based on the first and second network address mapping agreement rate, the first and third network address mapping agreement rate, and the second and third network address mapping agreement rate.

Other embodiments of this aspect include corresponding systems, apparatus, and computer programs, configured to perform the actions of the methods, encoded on computer storage devices.

In general, one innovative aspect of the subject matter described in this specification can be embodied in methods that include the actions of determining a confidence level for at least one of the second or third network address mappings based on the first and second network address mapping agreement rate, the first and third network address mapping agreement rate, and the second and third network address mapping agreement rate. The network addresses in each of the network address mappings are IP addresses or MAC addresses. The first network address mapping maps each of the plurality of network addresses to a plurality of locations at a respective plurality of probabilities, and wherein mapping each of the plurality of network addresses in the first network address mapping to a first location comprises mapping each of the plurality of network addresses to the most probable of the plurality of locations. The first network address mapping maps each of the plurality of network addresses to a plurality of locations at a respective plurality of probabilities, and wherein mapping each of the plurality of network addresses in the first network address mapping to a first location comprises mapping each of the plurality of network addresses to a random one of the plurality of locations. The first network address mapping, the second network address mapping, and the third network address mapping are statistically independent. The first, second and third locations comprise longitude and latitude coordinates, zip code information, town information, neighborhood information, county information, street address information, or country information. The confidence level associated with the first network address mapping is based on $$\sqrt{\frac{A1 \times A2}{A3}},$$

wherein A1 represents an agreement rate between the first network address mapping and the second network address mapping; A2 represents an agreement rate between the first network address mapping and the third network address mapping and A3 represents an agreement rate between the second network address mapping and the third network address mapping. The second network address mapping and the third network address mapping are derived from user account information, advertiser account information, wireless Internet access point information or licensed data.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Particular aspects of the subject matter described can be implemented to realize one or more of the following advantages. One advantage is that the confidence level associated with a set of measured or determined IP-location mapping data can be determined even if the independent data sets used to evaluate the determined data are noisy or not sufficiently accurate, e.g., have error rates greater than a predetermined accuracy level. Another advantage is the confidence level associated with the determined IP-location mapping data be determined even though no independent data set with 100% accuracy, a so-called "golden data set," exists. In addition, algorithms or systems used to generate the IP-location mapping data can be evaluated and a confidence level associated with the algorithm and/or system can be generated. In addition, the algorithm used to determine the determined IP-location mapping data can be revised based on the confidence level associated with the algorithm and/or system.

The details of one or more embodiments are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Figure 1:
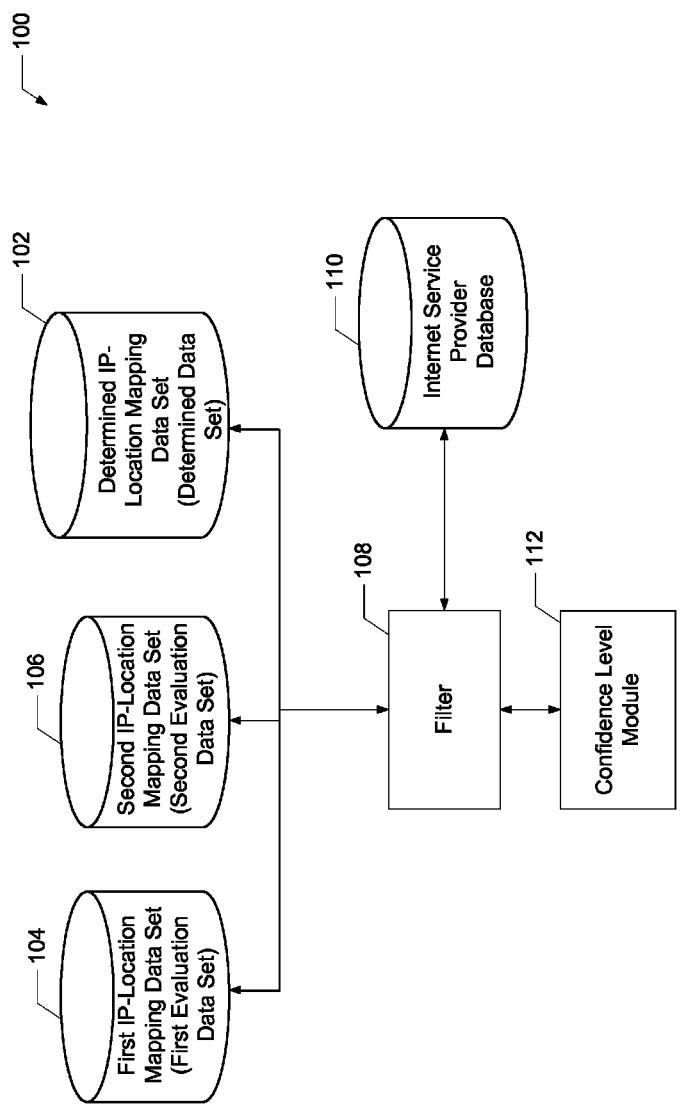
FIG. 1 is a block diagram of an example system for evaluating IP-location mapping data.

FIG. 1 is a block diagram of an example system for evaluating IP-location mapping data. The system 100 includes an IP-location mapping data set 102 determined by a geolocation prediction system, two independent IP-location mapping data sets, e.g., first and second evaluation data sets 104 and 106, a filter 108, an Internet service provider database 110 and a confidence level module 112. The determined IP-location mapping data set 102 can include IP addresses and geographical data, e.g., longitude and latitude coordinates, country, state, town, zip code, and so on, associated with or mapped to each IP address. The geographical data that is mapped to each IP address can be referred to as "geolocation data". The determined IP-location mapping data set can include a large number of IP addresses and corresponding geolocation data. For example, the determined IP-location mapping data set 102 can include 500 million IP addresses, or 5-10 million blocks of IP addresses, and corresponding geolocation data. In some implementations, the determined IP-location mapping data set 102 is organized such that the IP addresses are numerically ordered. In some implementations, the IP addresses and the corresponding geolocation data are stored as tuples or as other data structures. In some implementations, the determined IP-location mapping data set 102 includes a set of geolocation data for each IP address or range of IP addresses and a probability value that indicates the likelihood that a particular location in the set of geolocation data corresponds to the IP address. For example, an example IP address A.B.C.D can be mapped to the example set {(Location 1, 55%), (Location 2, 35%), (Location 3, 10%)}.

The determined IP-location mapping data set 102 can be provided by a system that maps geographical information to an IP address, e.g., a geolocation prediction system. For example, a system can generate geolocation data for a particular IP address using various signals or indicators, such as, for example, search queries originating from a computer associated with the IP address, e.g., geographical based queries, driving directions, or other information associated with the IP address, e.g., a web browser history, MAC addresses, Internet service provider, and so on.

The first and second evaluation data sets 104 and 106 can include IP addresses and geolocation data associated with each of the IP addresses. The first and second evaluation data sets 104 and 106 can include five to ten million IP addresses, for example, and corresponding geolocation data. The IP addresses and corresponding geolocation data can be stored in any way that allows for rapid and efficient access. In some implementations, the IP addresses included in the first and second evaluation data sets 104 and 106 can be mapped to sets of geolocation data identifying multiple locations and a probability value associated with each location in the set of geolocation data.

The first and second evaluation data sets 104 and 106 can be based on or derived from various sources. For example, the evaluation data sets 104 and 106 can be determined or derived from (1) databases that store billing and/or shipping addresses associated with user accounts, e.g., email accounts, social networking accounts, accounts associated with other user services, and the IP addresses associated with computers used to access these accounts; (2) databases that store billing and/or mailing addresses associated with advertisers and IP address associated with the advertisers' recent logins; (3) databases that includes IP addresses associated with a wireless Internet access point, e.g., WiFi hot spots, MAC addresses associated with the wireless Internet access point and a physical location associated with the access point; and (4) licensed geolocation data that is provided by a third party provider. Preferably each of the evaluation data sets 104 and 106 is derived from a different source. For example, the first evaluation data set 104 can be derived from billing and/or shipping addresses associated with user accounts and the IP addresses associated with the users' recent logins and the second evaluation data set 106 can be based on the advertiser's mailing and/or billing addresses and IP addresses associated with the advertisers' recent logins. In the following description, it is assumed that the first evaluation data set 104 is independent of the second evaluation data set 106, e.g., the first evaluation data set 104 is statistically independent of the second evaluation data set 106.

The Internet service provider database 110 can store IP addresses and data identifying the Internet service providers associated with the IP addresses. For example, the Internet service provider database 110 can store IP addresses, e.g., A.B.C.D00, or blocks of IP addresses/ranges of IP addresses, e.g., A.B.C.D1-A.B.C.D200 and the name of the Internet service provider, e.g., Acme Cable Provider, associated with the IP addresses or range of IP addresses. In some implementations, the Internet service provider database 110 stores a token or descriptor that uniquely identifies the Internet service provider. The Internet service provider database 110 can be any appropriate type of memory or database that can store IP addresses and the associated Internet service providers. The Internet service provider database 110 can be accessed by the filter 108. The Internet service provider database 110 can be used by the filter 108 to identify the Internet service provider associated with an IP address.

The filter 108 can select a predetermined number of IP addresses and the corresponding geographical locations mapped to the IP addresses from the determined IP-location mapping data set 102 to form a determined data subset. For example, the filter 108 can select two million IP addresses from the determined IP-location mapping data set 102. Although the predetermined number of IP addresses can vary, a large number of IP addresses, e.g., one million IP addresses, should be selected.

After selecting the determined data subset, the filter 108 can use the determined data subset to filter the first and second evaluation data sets 104 and 106 to form first and second evaluation subsets. For example, the filter 108 can select an IP address in the determined data subset and determine if the first and second evaluation data sets 104 and 106 include the selected IP address. If the selected IP address is in both the first and second evaluation data sets 104 and 106, then the filter 108 can copy the selected IP address and the corresponding geolocation data from the first and second evaluation data sets 104 into the first and second evaluation subsets. If the selected IP address is not included in the first and second evaluation data sets 104 and 106, the selected IP address is removed from the determined data subset and a new IP address is selected.

If the selected IP address is in only one of the two evaluation data sets, the filter 108 can use a matching algorithm to analyze the IP addresses in the evaluation data set that does not include the selected IP address and find the IP address that is: 1) closest to the selected IP address and 2) associated with the same Internet service provider as the selected IP address. Such an IP address, if one is found, may be referred to as "the substitute IP address". For example, if the selected IP address is 172.15.250.54 and is associated with Acme Cable Provider and the second evaluation data set 106 does not include the selected IP address, the filter 108 can analyze the IP addresses included in the second evaluation data set 106 to find the IP address that is 1) closest to the selected IP address using a prefix match criteria, e.g., 172.15.250.60, and 2) associated with Acme Cable Provider. The filter 108 can use a prefix match of the IP address to identify the closest IP address to the selected IP address. It is noted that IP addresses that are close to each other and that are provided by the same Internet service provider are likely to be or tend to be physically near each other. The filter 108 can access the Internet service provider database 110 to determine the Internet service provider associated with an IP address.

In some implementations, the filter 108 can also require that the numerical difference between the substitute IP address and the selected IP address be within a predetermined range. For example, an IP address can be selected as a substitute IP address if the difference between the two IP addresses is less than or equal to 25. If there are no IP addresses in the evaluation subset that satisfy the above requirements, e.g., associated with the same Internet service provider as the selected IP address and within a predetermined range, then the selected IP address is removed from the determined data subset and a new IP address is selected from the determined data subset. If a substitute IP address is found in the second evaluation data set 106, then the substitute IP address and the corresponding geolocation data are stored in the second evaluation subset and the IP address matching the selected IP address and the corresponding geolocation data from the first evaluation data set 104 are stored in the first evaluation subset.

The filter 108 can also determine whether the size of the determined data subset is greater than a predetermined threshold, which can be called "the minimum subset size." For example, the filter 108 can determine whether the size of the determined data subset is greater than or equal to one to two million entries, e.g., one to two million IP addresses. Although various threshold values can be used, the specified threshold should be at least two hundred. In some implementations, the specified threshold is 10,000. If the size of the determined data subset is less than the specified threshold, the filter 108 selects additional IP addresses from the determined IP-location mapping data set 102 and filters the additional IP addresses as described above. In some implementations, if the size of the determined data subset is greater than or equal to the specified threshold, the filter 108 can avoid selecting additional IP addresses.

The filter 108 can filter the determined IP-location mapping data set 102 and the first and second evaluation data sets 104,106 to form the subsets using other filtering or sampling techniques. For example, FIG. 3B, described below, illustrates another method to form the subsets.

The confidence level module 112 can analyze the three subsets and determine a confidence level for each of the subsets. For example, the confidence level module 112 can analyze the three subsets to determine the probability that the geolocation data associated with the IP addresses in one of the subsets is equal to or substantially equal to the geolocation data associated with the IP addresses in another of the subsets. The probability as to any pair of subsets can be referred to as the "agreement rate" for the pair. For the three pair-wise combinations of the subsets, e.g., the determined data subset and the first evaluation subset, the determined data subset and the second evaluation subset and the first and second evaluation subsets, the confidence level module 112 can compare each IP address and the corresponding geolocation data in the subsets to determine the probability that the geolocation data corresponding to the IP addresses in one subset are equal to or substantially equal to the geolocation data corresponding to the IP addresses in a different subset and determine an agreement rate for the pair of subsets.

Where the geolocation data corresponding to a particular IP address includes a set of locations and respective probability values, for each IP address, the location having the highest probability in the set can be selected as the corresponding geolocation data. In some implementations, a particular location in the set can be selected randomly.

The agreement rates for the three combinations can be written as:

$$\text{Agreement}(X,Y)=P(X=Y|\text{IP}) \quad (1)$$

$$\text{Agreement}(X,Z)=P(X=Z|\text{IP}) \quad (2)$$

$$\text{Agreement}(Y,Z)=P(Y=Z|\text{IP}) \quad (3)$$

where X represents the determined subset, Y represents the first evaluation subset, Z represents the second evaluation subset, and IP represents the IP addresses common to all three data subsets.

The confidence level module 112 can use the three agreement rates to determine the confidence level for each of the three subsets. On the assumption that the determined data subset and the first and second evaluation subsets are statistically independent, the agreement rate between a first and second subset is equal to the probability that the geolocation data corresponding to the IP addresses in a first and second subset are equal and are correct and the probability that the geolocation data corresponding to the IP addresses in a first and second subset are equal and are incorrect. Therefore, the agreement rate between two subsets can be written as:

$$\text{Agreement}(X,Y) = P(X\_is\_right \text{ and } Y\_is\_right|IP) + P(X\_is\_wrong \text{ and } Y\_is\_wrong \text{ and the geolocations are equal}|IP) \quad (4)$$

$$\text{Agreement}(X,Z) = P(X\_is\_right \text{ and } Z\_is\_right|IP) + P(X\_is\_wrong \text{ and } Z\_is\_wrong \text{ and the geolocations are equal}|IP) \quad (5)$$

$$\text{Agreement}(Y,Z) = P(Y\_is\_right \text{ and } Z\_is\_right|IP) + P(Y\_is\_wrong \text{ and } Z\_is\_wrong \text{ and the geolocations are equal}|IP) \quad (6)$$

The value of the term P(X_is_wrong and Y_is_wrong and the geolocations are equal|IP), P(X_is_wrong and Z_is_wrong and the geolocations are equal|IP) and P(Y_is_wrong and Z_is_wrong and the geolocations are equal|IP) tend to be small and can be approximated to be zero. Because the three data subsets are independent of each other, the agreement rates can be written as:

$$\text{Agreement}(X,Y) = P(X\_is\_right|IP) \times P(Y\_is\_right|IP) \quad (7)$$

$$\text{Agreement}(X,Z) = P(X\_is\_right|IP) \times P(Z\_is\_right|IP) \quad (8)$$

$$\text{Agreement}(Y,Z) = P(Y\_is\_right|IP) \times P(Z\_is\_right|IP) \quad (9)$$

Equations (7), (8) and (9) include three known terms, e.g., Agreement (X, Y), Agreement (X, Z) and Agreement (Y, Z), and three unknown terms, e.g., P(X_is_right|IP), P(Y_is_right|IP) and P(Z_is_right|IP). Therefore, equations (7), (8), and (9) can be rewritten and solved for the three unknowns. In other words, $$P(X\_is\_right|IP) = \sqrt{\frac{P(X=Y|IP) \times P(X=Z|IP)}{P(Y=Z|IP)}} \quad (10)$$

$$P(Y\_is\_right|IP) = \sqrt{\frac{P(X=Y|IP) \times P(Y=Z|IP)}{P(X=Z|IP)}} \quad (11)$$

$$P(Z\_is\_right|IP) = \sqrt{\frac{P(X=Z|IP) \times P(Y=Z|IP)}{P(X=Y|IP)}} \quad (12)$$

where P(X_is_right|IP) represents a probability that the geolocations included in the determined data subset are accurate, e.g., a confidence level of the determined data subset, P(Y_is_right|IP) represents a probability that the geolocations included in the first evaluation subset are accurate, e.g., a confidence level of the first evaluations subset, and P(Z_is_right|IP) represents a probability that the geolocations included in the second evaluation subset are accurate, e.g., a confidence level of the second evaluation subset. The confidence levels associated with each subset can be used to represent the confidence level associated with the three data sets 102, 104 and 106.

The confidence level module 112 can use the calculated confidence levels to generate a report. For example, the confidence level module 112 can generate a report that includes the confidence level associated with each of the data subsets. The report can be used by a system operator or an engineer to determine whether the system or algorithm that generated the determined IP-location mapping data set 102 is operating within acceptable ranges or should be revised to improve its calculated geolocation data. In some implementations, the report can include a recommendation that the algorithm or system be revised or improved. For example, if the confidence level associated with the determined IP-location mapping data set 102 is less than a predetermined threshold, e.g., 70%, the report can include a recommendation that the algorithm or system should be improved or reevaluated.

As explained above with reference to equations (4), (5) and (6), the value of the term P(X_is_wrong and Y_is_wrong and the geolocations are equal|IP) tends to be small and can be approximated to be zero. In some implementations, instead of approximating the value to be zero, the term can be approximated as a function of P(X_is_right|IP) and P(Y_is_right|IP).

For example, in reference to equation (4) above, the term P(X_is_wrong and Y_is_wrong and the geolocations are equal|IP) can expressed as P(X=Y|X_is_wrong and Y_is_wrong, IP)×P(X_is_wrong and Y_is_wrong|IP) because of the principles of conditional probability, i.e., P(A and B)=P(B|A)×P(A), where A and B are two events. Because X and Y are assumed to be independent data sets, the expression can be rewritten as follows:

$$P(X\_is\_wrong \text{ and } Y\_is\_wrong \text{ and the geolocations are equal}|IP) = P(X=Y|X\_is\_wrong \text{ and } Y\_is\_wrong, IP) \times (1-P(X\_is\_right|IP)) \times (1-P(Y\_is\_right|IP)) \quad (13)$$

If locations are selected randomly within a single country regardless of the IP address, the value of P(X=Y|X_is_wrong and Y_is_wrong, IP) can be approximated as follows:

$$P(X=Y|X\_is\_wrong \text{ and } Y\_is\_wrong, IP) \approx P(X(IP\_1) = Y(IP\_2)|IP\_1 \text{ and } IP\_2 \text{ are in the same country}) \quad (14)$$

where IP_1 and IP_2 are random IP addresses in the same country and X(IP_1) is the location corresponding to IP_1 in evaluation set X and Y(IP_2) is the location corresponding to IP_2 in evaluation set Y.

Equation (12) can then be rewritten as:

$$P(X\_is\_wrong \text{ and } Y\_is\_wrong \text{ and the geolocations are equal}|IP) = P(X(IP\_1) = Y(IP\_2)|IP\_1 \text{ and } IP\_2 \text{ are in the same country}) \times (1-P(X\_is\_right|IP)) \times (1-P(Y\_is\_right|IP)) \quad (15)$$

Similar approximations can be made for P(X_is_wrong and Z_is_wrong and the geolocations are equal|IP) and P(Y_is_wrong and Z_is_wrong and the geolocations are equal|IP). Based on these approximations, equations (7), (8) and (9) can be rewritten as:

$$\text{Agreement}(X,Y) = P(X\_is\_right|IP) \times P(Y\_is\_right|IP) + P(X(IP\_1) = Y(IP\_2)|IP\_1 \text{ and } IP\_2 \text{ are in the same country}) \times (1-P(X\_is\_right|IP)) \times (1-P(Y\_is\_right|IP)) \quad (7')$$

$$\text{Agreement}(X,Z) = P(X\_is\_right|IP) \times P(Z\_is\_right|IP) + P(X(IP\_1) = Z(IP\_2)|IP\_1 \text{ and } IP\_2 \text{ are in the same country}) \times (1-P(X\_is\_right|IP)) \times (1-P(Z\_is\_right|IP)) \quad (8')$$

$$\text{Agreement}(Y,Z) = P(Y\_is\_right|IP) \times P(Z\_is\_right|IP) + P(Y(IP\_1) = Z(IP\_2)|IP\_1 \text{ and } IP\_2 \text{ are in the same country}) \times (1-P(Y\_is\_right|IP)) \times (1-P(Z\_is\_right|IP)) \quad (9')$$

The values of P(X_is_right|IP), P(Y_is_right|IP) and P(Z_is_right|IP) can be determined by choosing values of IP that minimize the discrepancy of the observed data. For example, various optimization algorithms, e.g., a gradient descent algorithm, can be used to minimize the discrepancy between the determined data subset and the evaluation data subsets.

Figure 2:
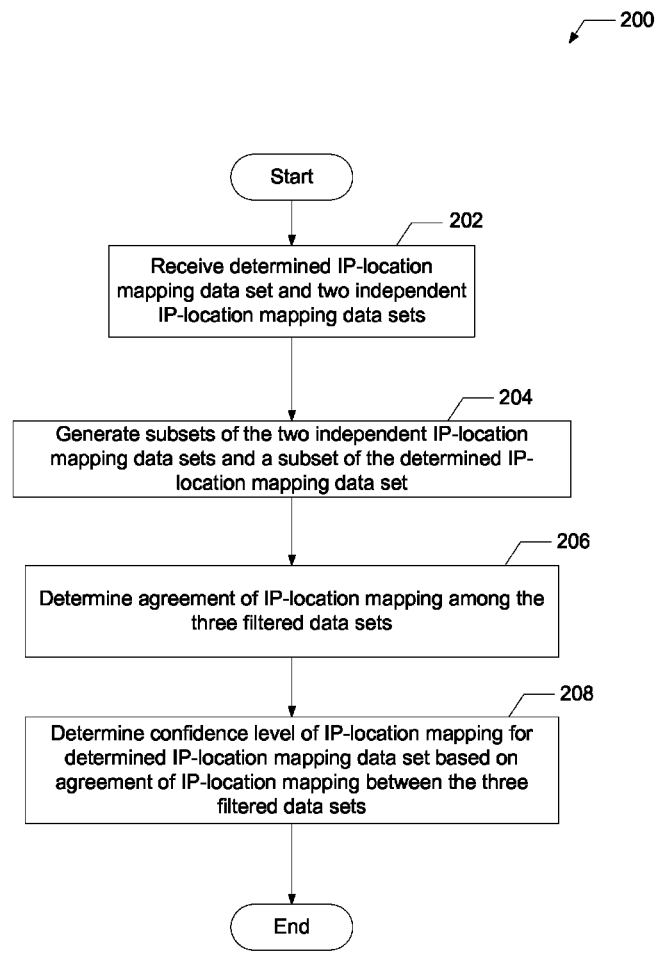
FIG. 2 illustrates an example process to evaluate IP-location mapping data.

FIG. 2 illustrates an example process 200 to evaluate geolocation data. The process can be performed, for example, by a system of one or more computers, e.g., system 100. For ease of discussion, the process 200 will be described with reference to the system 100 of FIG. 1.

The process 200 begins by receiving a determined IP-location mapping data set and two independent IP-location mapping data sets, e.g., first and second evaluation data sets (202). For example, the filter 108 can access a database or system that stores the determined IP-location mapping data set 102 and the first and second evaluation data sets 104 and 106, which are described above with reference to FIG. 1. As another example, the filter 108 can receive the determined IP-location mapping data set 102 and the first and second evaluation data sets 104 and 106 over a network connection.

Figure 3A:
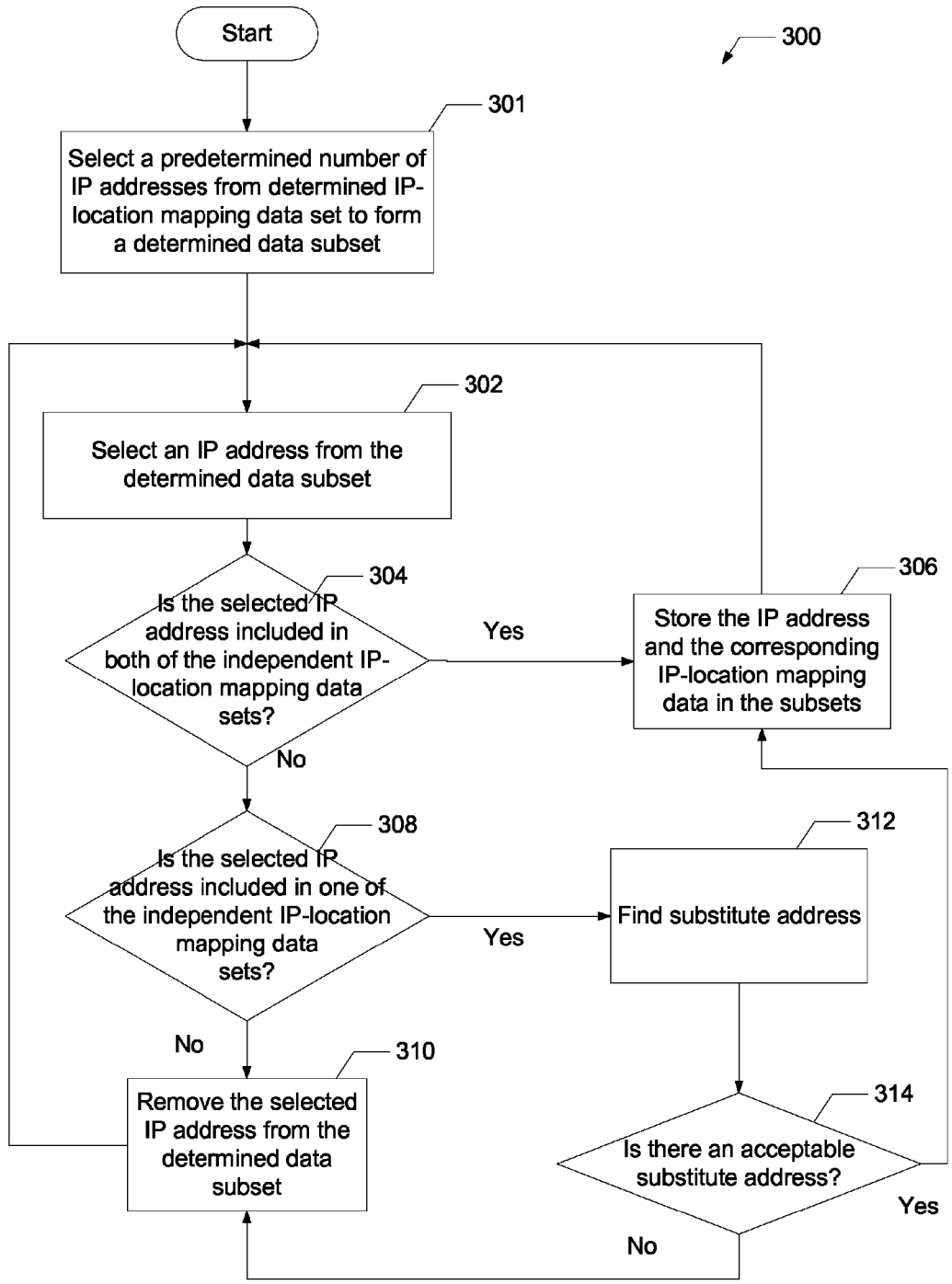
FIGS. 3A and 3B illustrate example processes to filter data sets.

The three data sets are filtered to generate three subsets (204). For example, the filter 108 can create three data subsets from the determined IP location-mapping data set 102, the first evaluation data set 104 and the second evaluation data set 106. An example process 300 to filter the data sets is illustrated in FIG. 3A.

Process 300 begins by selecting a predetermined number of IP addresses from the determined IP-location mapping data set to form a determined data subset (301). For example, as described above with reference to FIG. 1, the filter 108 can select five to ten million IP addresses and the corresponding geolocation data from the determined IP-location mapping data set 102 and form a determined data subset.

An IP address from the determined data subset is then selected (302). For example, the filter 108 can select an IP address from the determined data subset. The filter 108 can then determine whether the selected IP address is included in both the first and second evaluation data sets (302). For example, the filter 108 can analyze the IP addresses included in the first and second evaluation data sets 104 and 106 to determine whether the selected IP address is included in both the first and second evaluation data sets 104 and 106. If the first and second evaluation data sets include the selected IP address, the IP address and the corresponding geolocation data can be stored in first and second evaluation subsets (306). For example, the filter 108 can store the IP address and the corresponding geolocation data from the first evaluation data set 104 and the second evaluation data set 106 in a first evaluation subset and a second evaluation subset, respectively.

If the selected IP address is not included in both evaluation data sets (304), the filter can determine whether the selected IP address is included in one of the evaluation data sets (308). For example, the filter 108 can analyze the IP addresses included in the first and second evaluation data sets 104 and 106 to determine whether the selected IP address is included either the first or second evaluation data sets 104 and 106. If neither the first evaluation data set nor the second evaluation data set includes the selected IP address, then the selected IP address and the corresponding geolocation data can be removed from the determined data subset (310). For example, the filter 108 can remove the selected IP address and the corresponding geolocation data from the determined IP-location mapping data subset. A new IP address can then be selected from the determined data subset (302).

If the selected IP address is included in only one of the first or second evaluation data sets, then the filter searches for a substitute IP address in the evaluation data set that does not include the selected IP address, as described above with reference to FIG. 1 (312). If the filter 108 does not identify a substitute IP address (314), then the selected IP address and corresponding geolocation data are removed from the determined data subset (310) and a new IP address is selected from the determined data subset (302).

If a substitute IP address is identified (314), then the substitute IP address and the corresponding geolocation data are stored in the appropriate subset (306). For example, assuming the substitute IP address was identified in the second evaluation dataset, the filter 108 can store the substitute IP address and the corresponding geolocation data in the second evaluation subset and the selected IP address and the corresponding geolocation data from the first evaluation subset can be stored in the first evaluation subset. The process 300 continues until all of the IP addresses in the determined data subset are analyzed.

In some implementations, the determined data subset is analyzed to determine whether the size of the determined data subset is greater than or equal to a predetermined threshold, which can be called the "min subset size." For example, the filter 108 can count the number of IP addresses included in the determined data subset to determine if the size of the determined data subset is greater than the predetermined threshold. If the size of the determined data subset is less than the predetermined threshold, then additional IP addresses and the corresponding geolocation data can be selected from the determined IP-location mapping data set (302). For example, the filter 108 can select a number of additional IP addresses from the determined IP-location mapping data set based on the difference between the size of the determined data subset and the predetermined threshold. The additional IP addresses are then filtered as described above (204).

Figure 3B:
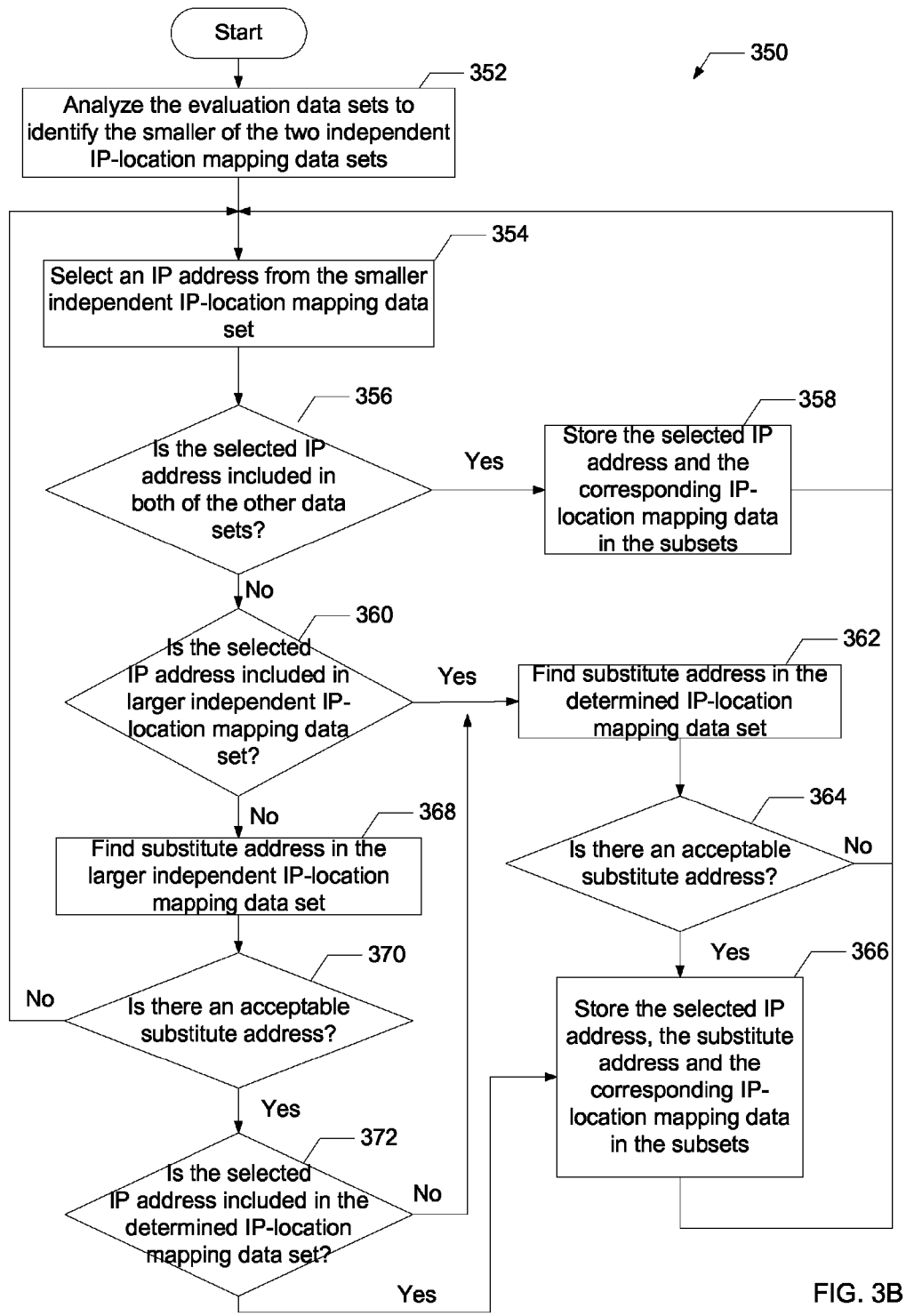

Another example process 350 to filter the data sets is illustrated in FIG. 3B. Process 350 begins by analyzing the two evaluation data sets 104 and 106 to determine which of the two evaluation data sets is smaller, e.g., includes less IP addresses or data (352). For example, the filter 108 can determine the number of IP addresses included in each of the evaluation data sets 104 and 106 to determine which of the two data sets is the smaller. For ease of presentation, it will be assumed that the first evaluation data set 104 is smaller than the second evaluation data set 106.

An IP address is selected from the first evaluation data set, i.e., the smaller evaluation data set (354).

The filter determines whether the selected IP address is in both the determined IP-location mapping data set and the larger evaluation data set (356). If the selected IP address is in both the determined IP-location mapping data set 102 and the larger, second evaluation data set 106, then the filter 108 can store the selected IP address and the corresponding geolocation data from the first evaluation data set 104 in a first evaluation data subset, the selected IP address and the corresponding geolocation data from the determined IP-location mapping data set 102 into a determined data subset and the selected IP address and the corresponding geolocation data from the second evaluation data set 106 into the second evaluation data subset (358).

If the filter determines that the selected IP address is not in both the determined IP-location mapping data set and the larger evaluation data set (356), then the filter determines whether the selected IP address is included in the larger evaluation data set (360).

If the selected IP address is included in the larger, second evaluation data set 106, then the filter 108 determines whether the determined IP-location mapping data set 102 includes a substitute IP address, as described above with reference to FIG. 1 (362). If the filter 108 does not identify a substitute IP address (364), then a new IP address is selected from the smaller evaluation data set (354).

If the filter identifies a substitute IP address in the determined IP-location mapping data set (364), the filter stores the IP addresses and the corresponding geolocation data in the appropriate subsets (366). For example, the filter 108 stores selected IP address and the corresponding geolocation data from the first evaluation data set 104 and second evaluation data set 106 in the first and second evaluation data subsets, respectively. The filter stores the substitute IP address from the determined IP-location mapping data set 102 and the corresponding geolocation data in the determined data subset. The process 350 continues by selecting another IP address from the smaller evaluation data set (354).

If the filter determines that the selected IP address is not included in the larger evaluation data set (360), the filter can determine whether the larger evaluation data set includes a substitute IP address (368), as described above with reference to FIG. 1. If the filter does not identify a substitute IP address (370), then a new IP address is selected from the smaller evaluation data set (354).

If the filter determines that the second evaluation data set includes a substitute IP address (370), the filter can determine whether the determined IP-location mapping includes the selected IP address, as described above (372). If the filter determines that the determined IP-location mapping data set includes the selected IP address, the filter can store the selected IP address and the geolocation data from the determined IP-location mapping data set and the first evaluation data set in the determined data subset and the first evaluation subset, respectively, and can store the substitute IP address from the second evaluation data set 106 and the corresponding geolocation data in the second evaluation data subset (366).

If the filter determines that the determined IP-location mapping data set does not include the selected IP address, the filter can determine whether the determined data subset includes a substitute IP address, as described above with reference to FIG. 1 (362). If the filter determines that the determined IP-location mapping data set does not include an acceptable substitute IP address, the process can select another IP address from the smaller evaluation data set (352). If the filter determines that the determined IP-location mapping data set includes a substitute IP address, the filter can store the selected IP address and the corresponding geolocation data in the first evaluation data subset and the substitute IP address and corresponding geolocation data from the determined IP-location mapping data set and the substitute IP address and corresponding geolocation data from the second evaluation data set in the determined data subset and the second evaluation subset, respectively (366). The process 350 continues by selecting a new IP address from the smaller evaluation data set (354).

As shown in FIG. 2, the confidence level module can determine the agreement rate between any two IP-location mapping data subsets (208). The agreement rate can be determined using equations (1), (2) and (3), described above. To do so, the confidence module initializes a plurality of counters to zero, one counter for each of the agreement rates Agreement (X,Y), Agreement (X,Z) and Agreement (Y,Z). The confidence module then loops through all of the common IP addresses (e.g., some number N) in each of the IP-location mapping data subsets determined above. For a given IP address, the confidence module determines three locations from the three IP-location mapping data subsets (e.g., locations LX, LY, and LZ). If any of the IP-location mapping data subsets maps an IP address to a set of locations (e.g., LX1, LX2, LX3), the confidence module can determine the location LX at random from among the set of locations. Alternatively, the confidence module can determine the most probable location (e.g., LX=LX2) from the set of locations. Next, the confidence module determines which of the locations LX, LY and LZ are in agreement. Different criteria can be used to determine whether two locations (e.g., LX and LY) are in agreement. For example, one criteria can require that LX and LY be identical or refer to the same location. Another, can be that LX and LY refer to adjacent locations (e.g., adjacent zip codes or adjacent cities). Another can be that LX and LY are separated by no more than a threshold distance (e.g., a distance of 1 or 5 miles). If the confidence module determines that any two locations (e.g., LY and LZ) are in agreement, the confidence module increments a counter for the agreement rate (e.g., Agreement (Y, Z)) between the IP-address mapping subsets from which those locations were determined. Once the confidence module has mapped all of the IP addresses that are common to the IP-address mapping subsets to their respective locations and counted the agreement between those locations (e.g., Agreement (X,Y), Agreement (X,Z) and Agreement (Y,Z)), the confidence module normalizes the agreement rates by dividing by the number of common IP-addresses that were mapped (e.g., by N).

A confidence level for the geolocation data included in the determined IP-location mapping data set can then be determined based on the agreement rates determined for the three filtered data sets (210). For example, on the assumption that the determined data subset and the first and second evaluation subsets are independent, the confidence level can be determined, e.g., using confidence level module 112, for each subset using equations (10), (11) and (12). Note that in each of equations (10), (11) and (12), the probabilities on the right hand side are simply the agreement rates determined above as indicated in equations (1), (2) and (3) (e.g., P (X=Y|IP)= Agreement (X, Y)).

The confidence levels associated with each subset can be used to represent the confidence level associated with the three data sets 102, 104 and 106.

Alternatively, as explained above, the confidence level for the determined data subset and the two filtered evaluation subsets can be determined from equations (7'), (8') and (9').

In some implementations, a report can be generated based on the confidence levels. For example, the confidence level module 112 can generate a report that includes the confidence level associated with the determined data subset, which represents the confidence level associated with the determined IP-location mapping data set 102. In addition, the confidence level module 112 can generate a report that includes the confidence level associated with the first and second evaluation subsets, which reflect the confidence level associated with the first and second evaluation sets 104 and 106.

In some implementations, the confidence level module 112 can calculate the confidence levels multiple times. For example, in implementations where the geolocation data corresponding to a particular IP address is a set of geolocation data and the corresponding geolocation data is selected randomly from the set, the confidence level module 112 can calculate the confidence levels many times, e.g., thousands or millions of times. The corresponding geolocation data can be randomly selected from the set each time the confidence level is calculated.

Although the systems and methods described above relate to determining the confidence level of IP geolocation mapping data, the systems and methods can be applied to other types of data sets. For example, the system can be used to determine the confidence level of other types of network address-geolocation mappings such as MAC address-geolocation mappings. Similarly, the system can be used to determine the confidence level of network address-network address mappings, such as IP-address-to-MAC address mappings. More generally, the system can be used to determine the confidence level of any type of mapping from A-B, given a plurality of independent or quasi-independent mappings from A-B as described above with respect to IP-address to geolocation mapping.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network, e.g., the Internet, and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Although a few implementations have been described in detail above, other modifications are possible. Moreover, other processes for training a classification model can be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
receiving, by one or more processors, a first, a second and a third network address mapping, each of the first, second and third network address mappings containing a plurality of common network addresses and one or more associated geographical locations to which each network address is mapped;
mapping, by the one or more processors, each of the network addresses in the first, second and third network address mappings to respective first, second and third geographical locations;
determining, by the one or more processors, for each of the network addresses in the first, second and third network address mappings, a first and second location agreement, a first and third location agreement, and a second and third location agreement;
for each network address mapping pair, determining, by the one or more processors, a pair-wise agreement rate including a first and second network address mapping agreement rate, a first and third network address mapping agreement rate, and a second and third network address mapping agreement rate, respectively based on the first and second location agreements, the first and third location agreements, and the second and third location agreements determined for each of the network addresses, wherein each agreement rate for the pairs of network address mappings represents a probability that, for each common network address in the pair, first geographical locations associated with the common network addresses in a first network address mapping in the pair are equal to or substantially equal to second geographical locations associated with the common network addresses in a second network address mapping in the pair;
determining, by the one or more processors, a confidence level associated with the first network address mapping based on the first and second network address mapping agreement rate, the first and third network address mapping agreement rate, and the second and third network address mapping agreement rate; and
when the confidence level is less than a predetermined threshold, providing, by the one or more processors, an indication to adjust the first network address mapping.

2. The computer-implemented method of claim 1, further comprising determining a confidence level for at least one of the second or third network address mappings based on the first and second network address mapping agreement rate, the first and third network address mapping agreement rate, and the second and third network address mapping agreement rate.

3. The computer-implemented method of claim 1, wherein the network addresses in each of the network address mappings are IP addresses or MAC addresses, and wherein the first, second, and third network address mapping are generated from three different respective server-side sources communicating with user devices at the IP addresses or MAC addresses, and wherein the respective agreement rates are based on an amount of mappings that agree between respective pairs of network address mappings per common mapping between the respective pairs of network address mappings.

4. The computer-implemented method of claim 1, wherein determining, for each of the network addresses in the first, second and third network address mappings, a first and second location agreement, a first and third location agreement, and a second and third location agreement further comprises respectively determining that the first and second geographical locations, the first and third geographical locations, and the second and third geographical locations are at least one of (a) the same geographical location, (b) adjacent geographical locations, or (c) geographical locations separated by a threshold distance.

5. The computer-implemented method of claim 1, wherein the first network address mapping maps each of the plurality of network addresses to a plurality of geographical locations at a respective plurality of probabilities, and wherein mapping each of the plurality of network addresses in the first network address mapping to a first geographical location comprises mapping each of the plurality of network addresses to the most probable of the plurality of geographical locations.

6. The computer implemented method of claim 1, wherein the first network address mapping maps each of the plurality of network addresses to a plurality of geographical locations at a respective plurality of probabilities, and wherein mapping each of the plurality of network addresses in the first network address mapping to a first geographical location comprises mapping each of the plurality of network addresses to a random one of the plurality of geographical locations.

7. The computer-implemented method of claim 1, wherein the first network address mapping, the second network address mapping, and the third network address mapping are statistically independent, and wherein the agreement rates are determined, at least in part, by counting numbers of mappings that agree between respective pairs of network address mappings and dividing the numbers of mappings that agree by respective numbers of common IP-addresses that were mapped in the respective pairs of network address mappings.

8. The computer-implemented method of claim 1, wherein the first, second and third geographical locations comprise longitude and latitude coordinates, zip code information, town information, neighborhood information, county information, street address information, or country information.

9. The computer-implemented method of claim 1, wherein the confidence level associated with the first network address mapping is based on $$\sqrt{\frac{A1 \times A2}{A3}},$$

wherein A1 represents an agreement rate between the first network address mapping and the second network address mapping; A2 represents an agreement rate between the first network address mapping and the third network address mapping and A3 represents an agreement rate between the second network address mapping and the third network address mapping.

10. The computer-implemented method of claim 1, wherein the second network address mapping and the third network address mapping are derived from user account information, advertiser account information, wireless Internet access point information or licensed data.

11. A system comprising:
memory; and
one or more processors coupled to the memory and perform operations comprising:
receiving a first, a second and a third network address mapping, each of the first, second and third network address mappings containing a plurality of common network addresses and one or more associated geographical locations to which each network address is mapped;
mapping each of the network addresses in the first, second and third network address mappings to respective first, second and third geographical locations;
determining, for each of the network addresses in the first, second and third network address mappings, a first and second location agreement, a first and third location agreement, and a second and third location agreement;
for each network address mapping pair, determining a pair-wise agreement rate including a first and second network address mapping agreement rate, a first and third network address mapping agreement rate, and a second and third network address mapping agreement rate, respectively based on the first and second location agreements, the first and third location agreements, and the second and third location agreements determined for each of the network addresses, wherein each agreement rate for the pairs of network address mappings represents a probability that, for each common network address in the pair, first geographical locations associated with the common network addresses in a first network address mapping in the pair are equal to or substantially equal to second geographical locations associated with the common network addresses in a second network address mapping in the pair;
determining a confidence level associated with the first network address mapping based on the first and second network address mapping agreement rate, the first and third network address mapping agreement rate, and the second and third network address mapping agreement rate; and
when the confidence level is less than a predetermined threshold, providing an indication to adjust the first network address mapping.

12. The system of claim 11, wherein the operations further comprise:
determining a confidence level for at least one of the second or third network address mappings based on the first and second network address mapping agreement rate, the first and third network address mapping agreement rate, and the second and third network address mapping agreement rate.

13. The system of claim 11, wherein the network addresses in each of the network address mappings are IP addresses or MAC addresses, and wherein the first, second, and third network address mapping are generated from three different respective server-side sources communicating with user devices at the IP addresses or MAC addresses, and wherein the respective agreement rates are based on an amount of mappings that agree between respective pairs of network address mappings per common mapping between the respective pairs of network address mappings.

14. The system of claim 11, wherein determining, for each of the network addresses in the first, second and third network address mappings, a first and second location agreement, a first and third location agreement, and a second and third location agreement further comprises respectively determining that the first and second geographical locations, the first and third geographical locations, and the second and third geographical locations are at least one of (a) the same geographical location, (b) adjacent geographical locations, or (c) geographical locations separated by a threshold distance.

15. The system of claim 11, wherein the first network address mapping maps each of the plurality of network addresses to a plurality of geographical locations at a respective plurality of probabilities, and wherein mapping each of the plurality of network addresses in the first network address mapping to a first geographical location comprises mapping each of the plurality of network addresses to the most probable of the plurality of geographical locations.

16. The system of claim 11, wherein the first network address mapping maps each of the plurality of network addresses to a plurality of geographical locations at a respective plurality of probabilities, and wherein mapping each of the plurality of network addresses in the first network address mapping to a first geographical location comprises mapping each of the plurality of network addresses to a random one of the plurality of geographical locations.

17. The system of claim 11, wherein the first network address mapping, the second network address mapping, and the third network address mapping are statistically independent, and wherein the agreement rates are determined, at least in part, by counting numbers of mappings that agree between respective pairs of network address mappings and dividing the numbers of mappings that agree by respective numbers of common IP-addresses that were mapped in the respective pairs of network address mappings.

18. The system of claim 11, wherein the first, second and third geographical locations comprise longitude and latitude coordinates, zip code information, town information, neighborhood information, county information, street address information, or country information.

19. The system of claim 11, wherein the confidence level associated with the first network address mapping is based on $$\sqrt{\frac{A1 \times A2}{A3}},$$

wherein A1 represents an agreement rate between the first network address mapping and the second network address mapping; A2 represents an agreement rate between the first network address mapping and the third network address mapping and A3 represents an agreement rate between the second network address mapping and the third network address mapping.

20. The system of claim 11, wherein the second network address mapping and the third network address mapping are derived from user account information, advertiser account information, wireless Internet access point information or licensed data.

21. A non-transitory computer-readable medium storing instructions that upon execution by a processing device cause the processing device to perform operations, comprising:
receiving a first, a second and a third network address mapping, each of the first, second and third network address mappings containing a plurality of common network addresses and one or more associated geographical locations to which each network address is mapped;
mapping each of the network addresses in the first, second and third network address mappings to respective first, second and third geographical locations;
determining, for each of the network addresses in the first, second and third network address mappings, a first and second location agreement, a first and third location agreement, and a second and third location agreement;
for each network address mapping pair, determining a pairwise agreement rate including a first and second network address mapping agreement rate, a first and third network address mapping agreement rate, and a second and third network address mapping agreement rate, respectively based on the first and second location agreements, the first and third location agreements, and the second and third location agreements determined for each of the network addresses, wherein each agreement rate for the pairs of network address mappings represents a probability that, for each common network address in the pair, first geographical locations associated with the common network addresses in a first network address mapping in the pair are equal to or substantially equal to second geographical locations associated with the common network addresses in a second network address mapping in the pair;
determining a confidence level associated with the first network address mapping based on the first and second network address mapping agreement rate, the first and third network address mapping agreement rate, and the second and third network address mapping agreement rate; and
when the confidence level is less than a predetermined threshold, providing an indication to adjust the first network address mapping.

22. The computer-readable medium of claim 21, wherein the operations further comprise determining a confidence level for at least one of the second or third network address mappings based on the first and second network address mapping agreement rate, the first and third network address mapping agreement rate, and the second and third network address mapping agreement rate.

23. The computer-readable medium of claim 21, wherein the network addresses in each of the network address mappings are IP addresses or MAC addresses, and wherein the first, second, and third network address mapping are generated from three different respective server-side sources communicating with user devices at the IP addresses or MAC addresses, and wherein the respective agreement rates are based on an amount of mappings that agree between respective pairs of network address mappings per common mapping between the respective pairs of network address mappings.

24. The computer-readable medium of claim 21, wherein determining, for each of the network addresses in the first, second and third network address mappings, a first and second location agreement, a first and third location agreement, and a second and third location agreement further comprises respectively determining that the first and second geographical locations, the first and third geographical locations, and the second and third geographical locations are at least one of (a) the same geographical location, (b) adjacent geographical locations, or (c) geographical locations separated by a threshold distance.

25. The computer-readable medium of claim 21, wherein the first network address mapping maps each of the plurality of network addresses to a plurality of geographical locations at a respective plurality of probabilities, and wherein mapping each of the plurality of network addresses in the first network address mapping to a first geographical location comprises mapping each of the plurality of network addresses to the most probable of the plurality of geographical locations.

26. The computer-readable medium of claim 21, wherein the first network address mapping maps each of the plurality of network addresses to a plurality of geographical locations at a respective plurality of probabilities, and wherein mapping each of the plurality of network addresses in the first network address mapping to a first geographical location comprises mapping each of the plurality of network addresses to a random one of the plurality of geographical locations.

27. The computer-readable medium of claim 21, wherein the first network address mapping, the second network address mapping, and the third network address mapping are statistically independent, and wherein the agreement rates are determined, at least in part, by counting numbers of mappings that agree between respective pairs of network address mappings and dividing the numbers of mappings that agree by respective numbers of common IP-addresses that were mapped in the respective pairs of network address mappings.

28. The computer-readable medium of claim 21, wherein the first, second and third geographical locations comprise longitude and latitude coordinates, zip code information, town information, neighborhood information, county information, street address information, or country information.

29. The computer-readable medium of claim 21, wherein the confidence level associated with the first network address mapping is based on $$\sqrt{\frac{A1 \times A2}{A3}},$$

wherein A1 represents an agreement rate between the first network address mapping and the second network address mapping; A2 represents an agreement rate between the first network address mapping and the third network address mapping and A3 represents an agreement rate between the second network address mapping and the third network address mapping.

30. The computer-readable medium of claim 21, wherein the second network address mapping and the third network address mapping are derived from user account information, advertiser account information, wireless Internet access point information or licensed data.

31. A computer-implemented method comprising:
receiving, at one or more processors, a first evaluation set, a second evaluation set and a first data set,
wherein the first data set comprises a first set of IP addresses and geographical locations, wherein each IP address is associated with a respective geographical location,
wherein the first evaluation set comprises a second set of IP addresses and geographical locations, wherein each IP address in the second set of IP addresses is associated with a respective geographical location, and
wherein the second evaluation set comprises a third set of IP addresses and geographical locations, wherein each IP address in the third set of IP addresses is associated with a respective geographical location;
selecting, by the one or more processors, an IP address from the first evaluation set;
forming, by the one or more processors, a first subset from the first data set, a first evaluation subset from the first evaluation set and a second evaluation subset from the second evaluation set based on the selected IP address;
determining, by the one or more processors a confidence level associated with the first data set based on agreement rates associated with the first subset and the first and second evaluation subsets, wherein the confidence level is based on a probability that a geographical location associated with a particular IP address included in the first data set is accurate, wherein each agreement rate represents, for each pair of subsets from the first subset, the first evaluation subset, and the second evaluation subset, a probability that, for each common IP address in the pair, first geographical locations associated with the common IP addresses in a first subset in the pair are equal to or substantially equal to second geographical locations associated with the common IP addresses in a second subset in the pair; and
generating, by the one or more processors, a report based on the confidence level associated with the first data set, wherein when the confidence level is less than a predetermined threshold the report includes an indication to adjust the first data set.

32. The computer-implemented method of claim 31, wherein the first set of IP addresses, the second set of IP addresses and the third set of IP addresses all have a subset of IP addresses in common.

33. The computer-implemented method of claim 31, further comprising:
analyzing the first evaluation set and the second evaluation set to determine whether the first evaluation set is smaller than the second evaluation set; and
selecting the IP address from the first evaluation set based on a determination that the first evaluation set is smaller than the second evaluation set.

34. The computer-implemented method of claim 33, wherein forming the first subset, the first evaluation subset and the second evaluation subset comprises:
determining whether the selected IP address is included in the second evaluation set and in the first data set; and
based on a determination that the selected IP address is included in the second evaluation set and in the first data set:
adding the selected IP address and the corresponding geographical location from the first evaluation set to the first evaluation subset;
adding the selected IP address and the corresponding geographical location from the second evaluation set to the second evaluation subset; and
adding the selected IP address and the corresponding geographical location from the first data set to the first subset.

35. The computer-implemented method of claim 34, wherein forming the first subset, the first evaluation subset and the second evaluation subset comprises:
based on a determination that the selected IP address is not included in the second evaluation set:
analyzing the second evaluation set to identify a substitute IP address, wherein the substitute IP address comprises a closest IP address based on a prefix match criteria and wherein the substitute IP address is associated with an Internet service provider associated with the selected IP address;
adding the substitute IP address and the corresponding geographical location from the second evaluation set to the second evaluation subset; and
adding the selected IP address and the corresponding geographical location from the first evaluation set to the first evaluation subset.

36. The computer-implemented method of claim 31, wherein the first data set, the first evaluation set and the second evaluation set are statistically independent.

37. The computer-implemented method of claim 31, wherein the geographical location comprises longitude and latitude information, zip code information, town information, neighborhood information, street address information, or country information.

38. The computer-implemented method of claim 31, wherein the confidence level associated with the first data set is based on $$\sqrt{\frac{A1 \times A2}{A3}},$$

wherein A1 represents an agreement rate between the first subset and the first evaluation subset; A2 represents an agreement rate between the first subset and the second evaluation subset and A3 represents an agreement rate between the first evaluation subset and the second evaluation subset.

39. The computer-implemented method of claim 38, wherein the confidence level associated with the first data set is based on:

$$P(X\_is\_right | IP) = \sqrt{\frac{P(X=Y|IP) \times P(X=Z|IP)}{P(Y=Z|IP)}},$$

$$P(Y\_is\_right | IP) = \sqrt{\frac{P(X=Y|IP) \times P(Y=Z|IP)}{P(X=Z|IP)}}, \text{ and}$$

$$P(Z\_is\_right | IP) = \sqrt{\frac{P(X=Z|IP) \times P(Y=Z|IP)}{P(X=Y|IP)}}, \text{ wherein}$$

P(X_is_right|IP) represents a probability that the geographical locations included in the first subset are accurate, P(Y_is_right|IP) represents a probability that the geographical locations included in the first evaluation subset are accurate, P(Z_is_right|IP) represents a probability that the geographical locations included in the second evaluation subset are accurate, P (X=Y|IP) represents an agreement rate between the first subset and the first evaluation subset, P (X=Z|IP) represents an agreement rate between the first subset and the second evaluation subset, P (Y=Z|IP) represents an agreement rate between the first evaluation subset and the second evaluation subset.

40. The computer-implemented method of claim 31, wherein the confidence level associated with the first data set is based on:

Agreement(X,Y)=P(X_is_right and Y_is_right|IP)+
P(X_is_wrong and Y_is_wrong and the geolocations are equal|IP);

Agreement(X,Z)=P(X_is_right and Z_is_right|IP)+
P(X_is_wrong and Z_is_wrong and the geolocations are equal|IP); and Agreement(Y,Z)=P(Y_is_right and Z_is_right|IP)+
P(Y_is_wrong and Z_is_wrong and the geolocations are equal|IP), wherein Agreement (X, Y) represents an agreement rate between the first subset and the first evaluation subset, Agreement (X, Z) represents an agreement rate between the first subset and the second evaluation subset, Agreement (Y, Z) represents an agreement rate between the first evaluation subset and the second evaluation subset, P(X_is_right and Y_is_right|IP) represents a probability that the geographical locations associated with the IP addresses in the first subset and the first evaluation subset are equal and are correct, P(X_is_right and Z_is_right|IP) represents a probability that the geographical locations associated with the IP addresses in the first subset and the second evaluation subset are equal and are correct, P(Y_is_right and Z_is_right|IP) represents a probability that the geographical locations associated with the IP addresses in the first evaluation subset and the second evaluation subset are equal and are correct, P(X_is_wrong and Y_is_wrong and the geolocations are equal|IP) represents a probability that the geographical locations associated with the IP addresses in the first subset and the first evaluation subset are equal and are incorrect, P(X_is_wrong and Z_is_wrong and the geolocations are equal|IP) represents a probability that the geographical locations associated with the IP addresses in the first subset and the second evaluation subset are equal and are incorrect, and P(Y_is_wrong and Z_is_wrong and the geolocations are equal|IP) represents a probability that the geographical locations associated with the IP addresses in the first evaluation subset and the second evaluation subset are equal and are incorrect.

41. The computer-implemented method of claim 31, wherein the first evaluation set and second evaluation set are derived from user account information, advertiser account information, wireless Internet access point information or licensed data.

* * * * *